(12) United States Patent
Quinn et al.

(10) Patent No.: US 7,930,226 B1
(45) Date of Patent: Apr. 19, 2011

(54) USER-DRIVEN DOCUMENT-BASED DATA COLLECTION

(75) Inventors: Christopher N. Quinn, Del Mar, CA (US); Anthony L. Creed, San Diego, CA (US); Kenichi Mori, Carlsbad, CA (US)

(73) Assignee: Intuit Inc., Mountain View, CA (US)

( * ) Notice: Subject to any disclaimer, the term of this patent is extended or adjusted under 35 U.S.C. 154(b) by 1163 days.

(21) Appl. No.: 11/491,645

(22) Filed: Jul. 24, 2006

(51) Int. Cl.
*G07F 17/22* (2006.01)
*G07F 19/00* (2006.01)

(52) U.S. Cl. .......................................... 705/31
(58) Field of Classification Search ................ 705/31
See application file for complete search history.

(56) References Cited

U.S. PATENT DOCUMENTS

| | | | |
|---|---|---|---|
| 4,553,261 A | 11/1985 | Joseph | |
| 6,078,924 A | 6/2000 | Ainsbury et al. | |
| 6,850,950 B1 * | 2/2005 | Clarke et al. | 1/1 |
| 7,117,374 B2 * | 10/2006 | Hill et al. | 713/193 |
| 7,548,885 B2 * | 6/2009 | Dutta et al. | 705/43 |
| 7,610,227 B2 * | 10/2009 | Wyle | 705/31 |
| 7,668,763 B1 * | 2/2010 | Albrecht | 705/31 |
| 2002/0111888 A1 * | 8/2002 | Stanley et al. | 705/31 |
| 2005/0004885 A1 | 1/2005 | Pandian et al. | |
| 2005/0165780 A1 | 7/2005 | Omega | |
| 2005/0203970 A1 | 9/2005 | McKeown et al. | |
| 2006/0026083 A1 * | 2/2006 | Wyle | 705/31 |
| 2006/0080305 A1 | 4/2006 | Dill et al. | |
| 2007/0027894 A1 * | 2/2007 | Bridges et al. | 707/102 |
| 2007/0260974 A1 * | 11/2007 | Hauser | 715/513 |
| 2009/0180136 A1 * | 7/2009 | Teranishi | 358/1.15 |

OTHER PUBLICATIONS

"Taxware(R) Enhances Functionality of Sales/Use Tax System With Interface to PaperVision(R) Enterprise Software for Document Management." PR Newswire Jun. 17, 2003 Business Dateline, ProQuest. Web. Feb. 3, 2011.*

* cited by examiner

*Primary Examiner* — Matthew S Gart
*Assistant Examiner* — Oluseye Iwarere
(74) *Attorney, Agent, or Firm* — Osha • Liang LLP (57) ABSTRACT

A user-driven document data collection system may allow the user to enter document data in no particular order. The data collection system may help the user identify documents and determine whether those documents are relevant. The document data collection system may also allow the user to input a description of a document, identify the document based on the description, and determine whether or not the document is appropriate for data collection. The data collection system may be configured to display example documents for the user to verify the identification of a document. A user may enter data for a document via a data entry screen based in part on a scanned image of the document. The document data collection system may analyze the data from documents to determine whether or not any additional information, such as from additional documents, is required to perform a particular task using the document data.

27 Claims, 9 Drawing Sheets

Identify a Document

Please enter description of the document:   310

I've got this paper that came in the mail and says important tax document enclosed. It came from my, company ABC Stores. It has 20 or so boxes on it. The first box says "box 1, wages".

( scan document )— 370    330    320 —( Identify )

Based on your description, the document is probably a W2, a statement of your income from you employer. Does it look like any of these? If so, please select the image that most resembles your document.

— 350

340 —

If your document does not resemble any of the above images, please use the document identification tool to identify your document.

( Document Identity Tool )—360

Data Collection:

Please enter the information from your W2 below:
(type the information exactly as it appears on your copy)

410  420  430  440  450

| a Control number | 22222 | OMB No. 1545-0008 | | |
|---|---|---|---|---|
| b Employer identification number<br>97-000000 | | 1 Wages, tips, other compensation<br>28800 | 2 Federal income tax withheld<br>1512 | |
| c Employer's name, address, and ZIP code<br>ABC STORES<br>123 ALPHABET ROAD<br>OGDEN UT 84405 | | 3 Social security wages<br>28800 | 4 Social security tax withheld<br>1785 | |
| | | 5 Medicare wages and tips<br>28800 | 6 Medicare tax withheld<br>418 | |
| | | 7 Social security tips | 8 Allocated tips | |
| d Employee's social security number<br>529-00-0000 | | 9 Advance EIC payment | 10 Dependent care benefits | |
| e Employee's first name and initial    Last name<br>JAMES ROUND<br>100 LAZY LANE<br>OGDEN UT 84408 | | 11 Nonqualified plans | 12a | |
| | | 13 ☐ ☐ ☐ | 12b | |
| | | 14 Other | 12c | |
| | | | 12d | |
| f Employee's address and ZIP code | | | | |
| 15 State  Employer's state ID number<br>UT  Z12345 | 16 State wages, tips, etc<br>28800 | 17 State income tax<br>1272 | 18 Local wages, tips, etc | 19 Local income tax | 20 Locality name |

Form W-2 Wage and Tax Statement    2004    Department of the Treasury—Internal Revenue Service
Copy 1—For State, City, or Local Tax Department ( Done )

Identify a Document

Please enter description of the document:

I've got this phone bill that I think might be relevant but I'm not sure. I made a few calls to the office that I think are tax deductible. —310 scan document —370

Identify —320

Your phone bill is not going to be useful on your tax return unless you can claim a home office or the expenses related to your calls exceed $500. If neither of these apply, you can discard your phone bills.

Do you still want to enter the data from you document? —710

Yes, let me enter the data —720

No, I'll discard this document —730

USER-DRIVEN DOCUMENT-BASED DATA COLLECTION

BACKGROUND

Typically, forms-based data collection systems, such as tax return preparation software, present a long list of questions (e.g., in the form of a series of user interface questionnaire screens or forms) to determine what information the user has and/or needs. Traditional forms-based data collection systems frequently ask every user every possible question regardless of whether or not the question actually applies to the user. Generally, forms-based data collection systems ask specific, often industry specific, questions regarding individual pieces of data. Thus, users are frequently confused into thinking they need the specific information instead of realizing that the information doesn't apply to a particular user's situation. For example, tax preparation software frequently asks questions regarding sometimes extremely complicated tax issues, often using esoteric terms (sometimes by necessity), that don't apply to an average individual. The questions asked by traditional tax preparation software generally are Yes/No type questions. For example, a program may ask various Yes/No questions in the form, "Do you have . . . ?", over and over again until the user answers in the positive in regard to various types of documents or forms. Thus, when using traditional forms-based data collection system, a user may spend much time providing negative answers to questions that are irrelevant to the user's situation.

Some traditional document data collection systems may ask the user hundreds of questions to determine exactly what documents the user has and that need to be entered. Frequently the user must search through a collection of documents to locate and obtain every document the data collection system needs in order to enter the documents in the exact order the system requires. Generally the order of data entry is not intuitive to the user. For example, traditional tax return preparation software frequently uses the government developed tax return forms as a basis for the order in which it requires the user to enter data. As the government tax forms are frequently considered poorly organized and not user-friendly, this can result in tax return preparation software that is non-intuitive and not user-friendly as well.

Additionally, after answering all the questions presented by the data collection system and entering all the data required by the data collection system, a user may have documents "left over" from which the data collection system did not request any data. The user may therefore be confused and left wondering whether or not they answered all the questions correctly or had misinterpreted questions presented by the data collection system.

SUMMARY

A user-driven document-based data collection system, such as may be part of tax return preparation software, may allow the user to enter data from documents in no particular order. The data collection system may be configured to allow the user to enter the data for whatever documents the user has and may then analyze the data from those documents to determine whether or not any additional information, such as from additional documents, is required to perform a particular task with the document data, such a preparing a tax return.

The data collection system may also be configured to help the user identify documents and determine whether those documents are appropriate for data collection for data to be used to perform a particular task. In one embodiment, the data collection system may be configured to allow the user to enter a description of a physical document, identify the document based on the description, and determine whether or not the document is relevant to a particular task being performed, such as preparing and filing a tax return. For example, in one embodiment, a document data collection system that is part of tax return preparation software may receive a description of a phone bill, determine that the phone bill is not useful for a current tax return being prepared.

Additionally, the document data collection system may be configured to display example documents to aid in identifying a physical document. For example, based on a user-supplied description of a document, the document data collection system may display images one or more documents likely to correspond to the physical document and ask the user to identify which of the displayed images most closely resembles the physical document. The document data collection system may also be configured to allow a user to enter data via a data entry screen or user interface that is based one a scanned image of a document.

In some embodiments, the data collection system may be configured to receive a scanned image of a physical document, such as via a page scanner, digital camera, or other image capture means, and identify the physical document based on the scanned image. For example, the data collection system may include optical character recognition (OCR) software and may perform various OCR functions on the scanned image to identify the physical document. In another embodiment, the data collection system may be configured to communicate a scanned image of a document to a remote computer and receive the identity of the physical document from the remote computer. For example, customer service representatives and/or additional software, such as OCR software, located remotely from the document data collection system may analyze the scanned image to identify the document.

While the user-driven document-based data collection system is described herein by way of example for several embodiments and illustrative drawings, those skilled in the art will recognize that the document-based data collection system is not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope of the document-based data collection system as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

A user-driven document data collection system, as described herein, may be configured to allow the user to determine the order in which data from documents is entered into the system. For example, a tax return preparation system or application may include a document data collection system, as described herein, and may be configured to allow the user to determine which documents to enter into the system and in what order the documents are entered. Thus, rather than imposing an organization system, such as what order to enter document data, on the user, the document data collection system may be configured to follow an organizational order imposed by the user. For instance, a user may be able to enter tax-related documents in any order and once the user has finished entering the data from all the documents he has, the tax preparation system may then analyze all the entered data from all the documents in order to prepare a tax return. Please note that while described herein mainly in reference to tax preparation system, the user-driven document data collection system described herein may be utilized by, or incorporated in, virtually any system that includes collecting data from physical documents, such as purchasing systems, bookkeeping systems, inventory management systems, as well as other financial and/or tax related systems.

Figure 1A:
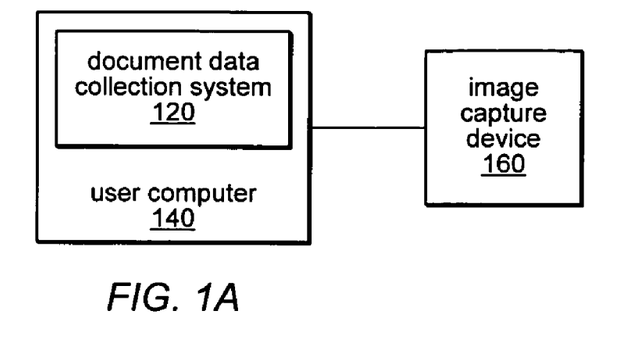
FIGS. 1A and 1C are block diagrams illustrating embodiments of a data collection system as described herein.
Figure 1B:
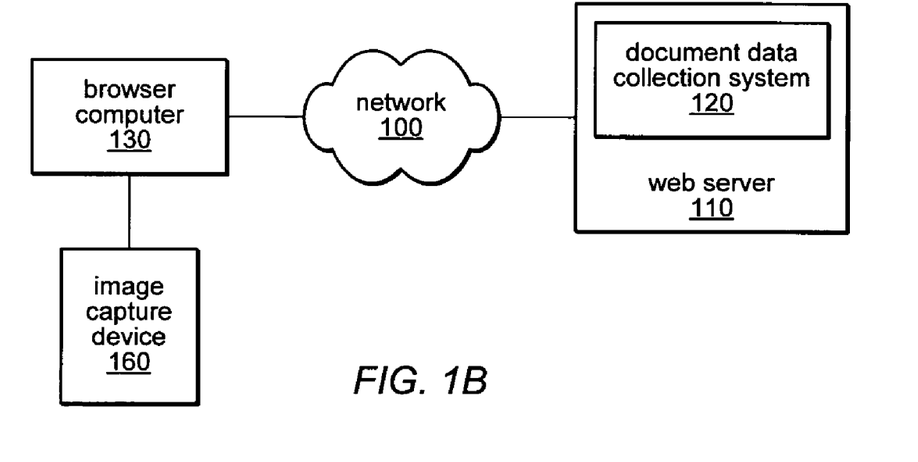
Figure 1C:
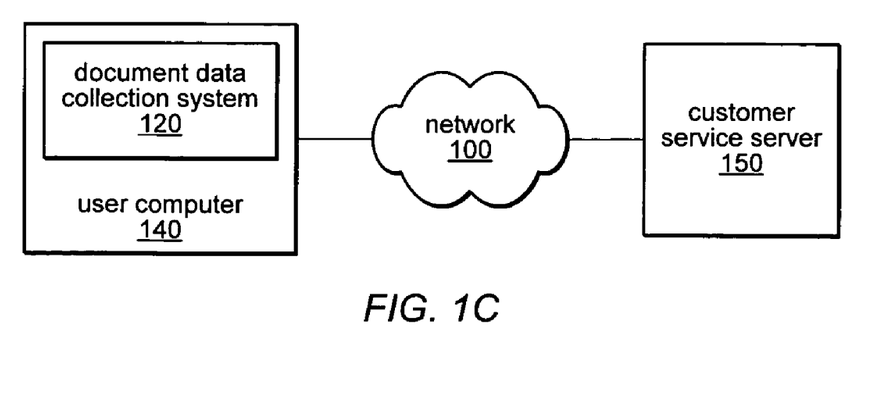

As illustrated by FIGS. 1A, 1B, and 1C, the document data collection system described herein may be implemented in various system configurations, according to different embodiments. For instance, as illustrated in FIG. 1A, document data collection system 120 may be implemented on a stand-alone computer system, such as user computer 140. User computer 140 may represent any of various types of computer systems, such as a user desktop computer (e.g. IBM PC™, Apple Macintosh™, Dell™), a laptop, workstation, and other stand-alone computer systems, according to various embodiments. Document data collection system 120 may also be implemented as a web-based system according to some embodiments, as illustrated in FIG. 1B. Thus, in one embodiment, document data collection system 120 may be implemented or executed on web server 110, and a user may use a browser computer 130 (i.e. any computer system including web browsing technology) to access web server 100 and document data collection system 120 across network 100. Network 100 may represent various types of computer networks, whether wired or wireless, including the Internet, a local area network, a wide area network, a peer-to-peer network, the public switched telephone network, or a combination of various computer-accessible networking technologies. Document data collection system 120 may also be implemented using a combination of stand-alone and networked components according to some embodiments, as illustrated by FIG. 1C. For example, in one embodiment, document data collection system 120 may execute on user computer 140 but may also communicate with, and utilize the service of, various components remotely located, such as on customer service server 150.

Please note that FIGS. 1A, 1B and 1C illustrate three example embodiments of a document data collection system as described herein. Other embodiments may include different, additional or fewer components or may receive information and/or input from different sources. Additionally, FIG. 1 and others of the figures use like reference numerals to identify like elements.

A data collection system, such as document data collection system 120, may be configured to help the user identify documents and determine whether those documents are appropriate for data collection. In one embodiment, document data collection system 120 may be configured to allow the user to input a human language description of a physical document, identify the document based on the description, and determine whether or not the document is appropriate for data collection, as will be described in more detail below. For example, in one embodiment, document data collection system 120 may be part of a tax return preparation application and may receive a description of a phone bill from a user. Document data collection system 120 may then determine that the phone bill is not useful for a current tax return being prepared and inform the user that phone bill is not appropriate for data collection, according to one embodiment.

Additionally, a user may have a document, but may not be sure what the document is and/or whether the document is relevant to the particular task for which data collection is being performed. For instance, in a tax return preparation application, a user may have received various documents from different financial and/or governmental institutions and may not know exactly which documents are actually needed for preparing a tax return. While in some embodiments, document data collection system 120 may be configured to give the user an option to have document data collection system 120 guide, or direct, the user through the data collection process, such as by asking the user various questions to determine which documents the user has, in other embodiments, document data collection system 120 may be configured to allow the user to enter data from whatever documents the user desires in whatever order the user desires to enter them. For instance, a user may have collected documents related to tax preparation over the course of several months before actually using tax return preparation software. The user rarely has the ability, or desire, to organize such documents in the exact order that the tax return preparation software may ask for them if the user opts to have the software direct the data collection process. Instead, individuals generally just store all the documents together in no particular order. Therefore, in some embodiments, document data collection system 120 may be configured to allow the user to enter data from the documents in whatever order the user desires, including in no particular order. Thus, document data collection system 120 may implement various ways of helping the user identify, and enter the data from, various documents.

Figure 2:
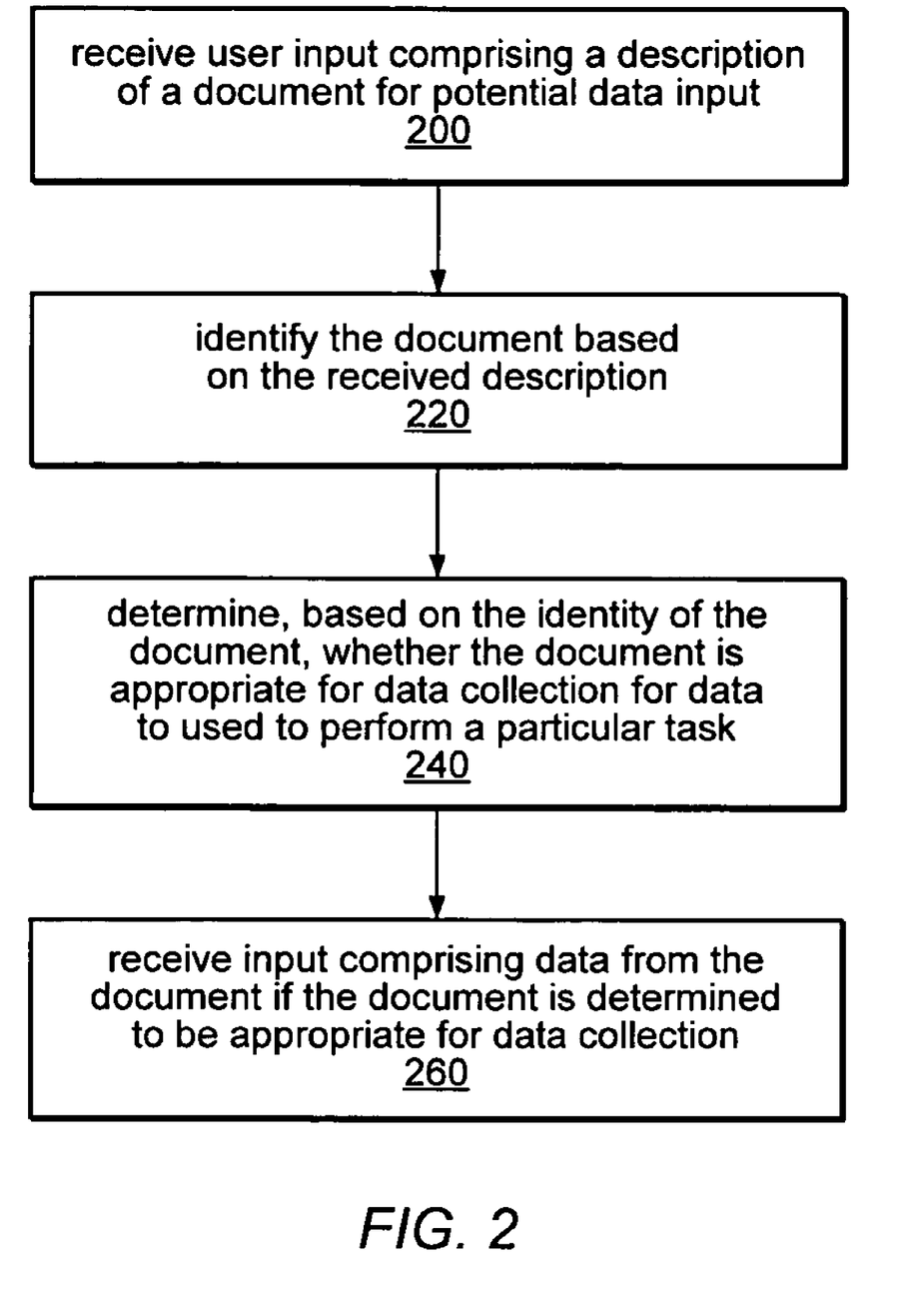
FIG. 2 is a flowchart illustrating one embodiment of a method for user-driven document data collection, as described herein.

FIG. 2 is a flow chart illustrating one embodiment of a method for user-driven, document data collection, such as may be implemented by document data collection system 120. As illustrated at block 200, document data collection system 120 may receive user input including a description of a document for potential data input. Document data collection system 120 may be configured to allow the user to describe a document in various manners, as will be described in more detail below. For example, a user may simply enter a few words that appear on the document, such as an identifying label for the entire document or a few of the labels for individual data items on the document. Document data collection system 120 may then identify the document based on the received description, as illustrated in block 220. For example, in one embodiment, document data collection system 120 may be part of a tax return preparation application and may identify a document as a W2 form based on a user-supplied description including the terms "W2", "wages", and "income". In some embodiments, document data collection system 120 may be configured to allow the user to enter a long description in complete sentences, while in other embodiments, document data collection system 120 may be configured to encourage the user to enter keywords from the document as a description.

Document data collection system 120 may also be configured to determine whether the document is appropriate for data collection based on the identified document, as illustrated by block 240. For instance, a user may have described a document that is not relevant to the underlying data collection process. For example, in one embodiment a user may have described a phone bill, non-interest bearing bank account summary, or other document not relevant to tax preparation when using a document data collection system that is part of a tax return preparation application. After determining whether the document is appropriate for data collection, document data collection system 120 may be configured to receive input including data from the document if the document was determined to be appropriate for data collection to perform the particular task of preparing the tax return, as illustrated in block 260. Document data collection system 120 may be configured, in regard to a particular task, such as preparing a tax return, to receive a user-supplied description of multiple documents in turn, as well identify the documents, determine whether each document is appropriate for data collection for data to perform the particular task, and receive the data from each document that is determined to be appropriate for data collection. Various manners in which document data collection system 120 may be configured to receive input including data from a document will be described in more detail below regarding FIG. 4.

Figure 3:
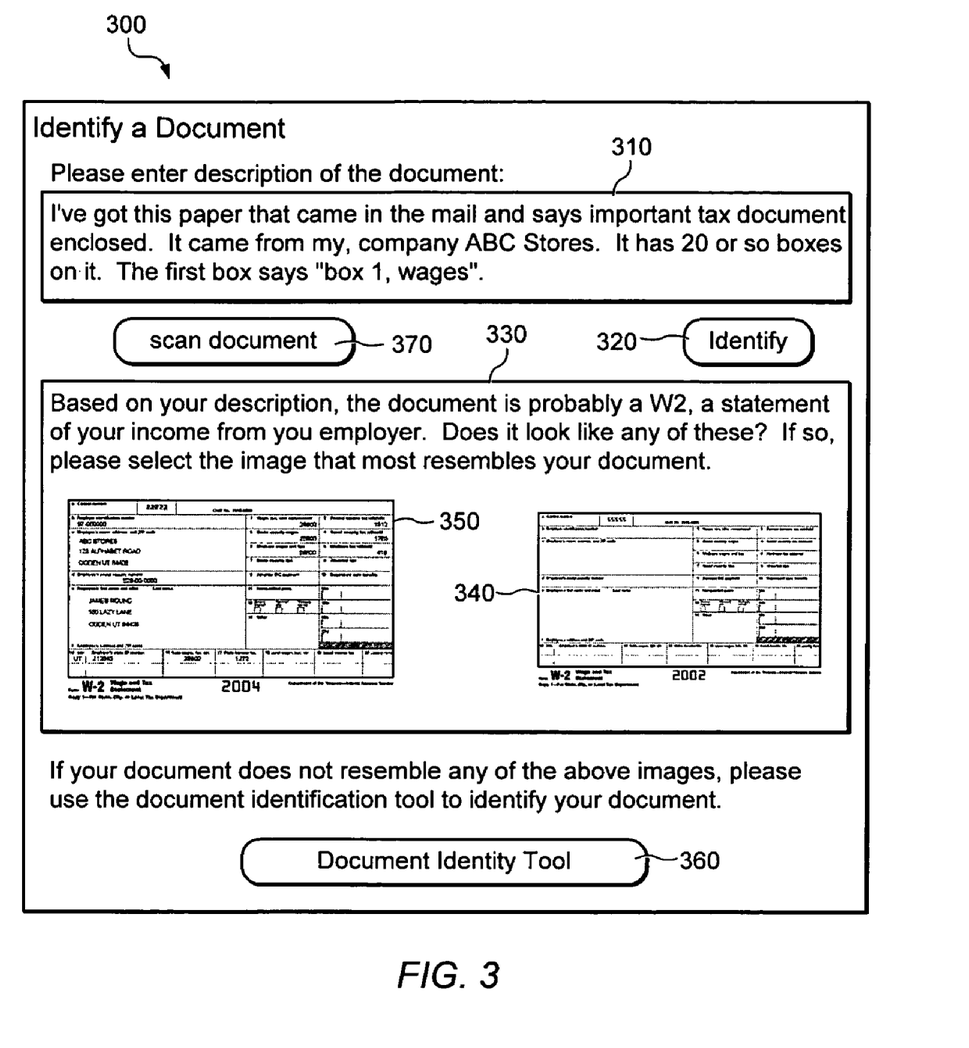
FIG. 3 is a block diagram illustrating one embodiment of a user interface for identifying a document, as described herein.

As described above, document data collection system 120 may be configured to identify a document based on a user-supplied description. In some embodiments, document data collection system 120 may also be configured to display one or more images of example documents based on the user's description and ask the user to select the image that most closely resembles the document they have. FIG. 3 illustrates one embodiment of a user interface for identifying a document based on a user's description and using example images. User interface 300 may be a dialog box displayed in response to a user requesting document data collection system 200 to identify a document. As described above, the user may enter a description of the document, such as in text entry box 310. After entering the description, the user may then request identification of the document by selecting "Identify" button 320. Please note that any of various user interface controls suitable or entering text and making an action selection may be utilized by document data collection system 120, according to different embodiments. For example, instead of a mouse or keyboard enabled pushbutton, document data collection system 120 may implement a pull down or popup menu item allowing the user to signal that they have entered a description and to request identification of the document.

While described above regarding FIG. 2 as a human language based textual description, in other embodiments, the description of a document entered by the user may not be a textual description at all. For instance, in one embodiment, document data collection system 120 may be configured to receive a scanned image of part or all of a document as a description of a document, such as in response to the user selecting a "scan document" button 370. Document data collection system 120 may then analyze the scanned image to identify the document, such as by optical character recognition (OCR) or image comparison. In one embodiment, document data collection system 120 may be configured to directly interface with an image capture device 160, such as a digital camera, webcam, flatbed scanner or other image capture means, in order to receive a scanned image of a document. In other embodiments however, document data collection system 120 may be configured to import a previously scanned image of a document. Thus a user may scan a document using another piece of software and then import the scanned image into document data collection system 120. Document data collection system 120 may support importing scanned images of documents in various formats, such as JPG, GIF, WMF, PDF, postscript and other graphical document standards.

Additionally, a user may use an electronic version of a document as a document description in document data collection system 120. For instance, in some embodiments, document data collection system 120 may be configured to import a document's content in an electronic format rather than importing the document an image format and analyzing the image to recover the data content. For example, some W2 providers may supply W2 content in an electronic format, such as in a XML formatted file. Thus, document data collection system 120 may be configured to import document data and/or content from files formatted according to any of various document formatting standards, such as XML, HTML, plain text (ASCII), word processing (Microsoft Word™, WordPerfect™), spreadsheet (Microsoft Excel™), among other document formats.

In some embodiments, document data collection system 120 may be configured to communicate with remote systems, such as over the Internet, to collect and/or import one or more documents for a user, as will be described in more detail below. For example, document data collection system 120 may be configured to communicate with a user's W2 provider, such as by presenting the user's credentials, and download the user's W2 content information directly, such as in one of the electronic data formats discussed above.

In response to the user requesting identification of a document, such as by selecting "Identify" pushbutton 320, document data collection system 120 may be configured to analyze the entered description to identify the type of document the user has. For example, document data collection system 120 may perform keyword analysis on the description and compare one or more keywords from the description with a database, or other collection, associating keywords with document types. For example, in the embodiment illustrated in FIG. 3, document data collection 120 may determine that a "tax document" from a user's "company" that includes a "wages" "box" is associated with a W2 statement. In some embodiments, document data collection system 120 may be configured to display one or more example documents so that the user may verify the document's identity. Thus, as illustrated in FIG. 3, document data collection system 120 may display an explanation of the document as identified by document data collection system 120 and may also display one more example document images for the user. For instance, in the embodiment illustrated in FIG. 3, document data collection system 120 may display explanation 330 describing a W2 statement and may also display images 340 and 350 of example W2 statements. Each of the displayed images may also be an active user interface element allowing the user to select the particular image that most resembles the user's document. Additionally, document data collection system 120 may determine which images to display based on information from the user's description or based on information already collected from other documents. For example, the user may have included a name of the user's employer in the document description and document data collection system 120 may be able to determine the most likely formats of W2 statement used by that particular employer and display example images of W2 statements accordingly.

Document data collection system 120 may be configured to store a database, or other collection, of example images for various types of documents, either locally or remotes, such as on customer service server 160, according to various embodiments. In one embodiment, document data collection system 120 may be configured both to access a local collection of example images and to communicate with a remote computer, such as customer service server 160, to obtain additional example images. For example, document data collection system 120 may be configured to obtain new example images from a remote computer that were not available when document data collection system 120 was distributed.

Document data collection system 120 may also be configured to allow the user to select a more detailed document identification process if none of the displayed images resemble the user's document or if the user is otherwise unsure of document data collection system 120's identification of the document. For example, as illustrated in FIG. 3, document data collection system 120 may be configured to display a pushbutton 260, or another user interface control type, allowing the user to select a different document identification process, as will be describe in more detail below.

Figure 4:
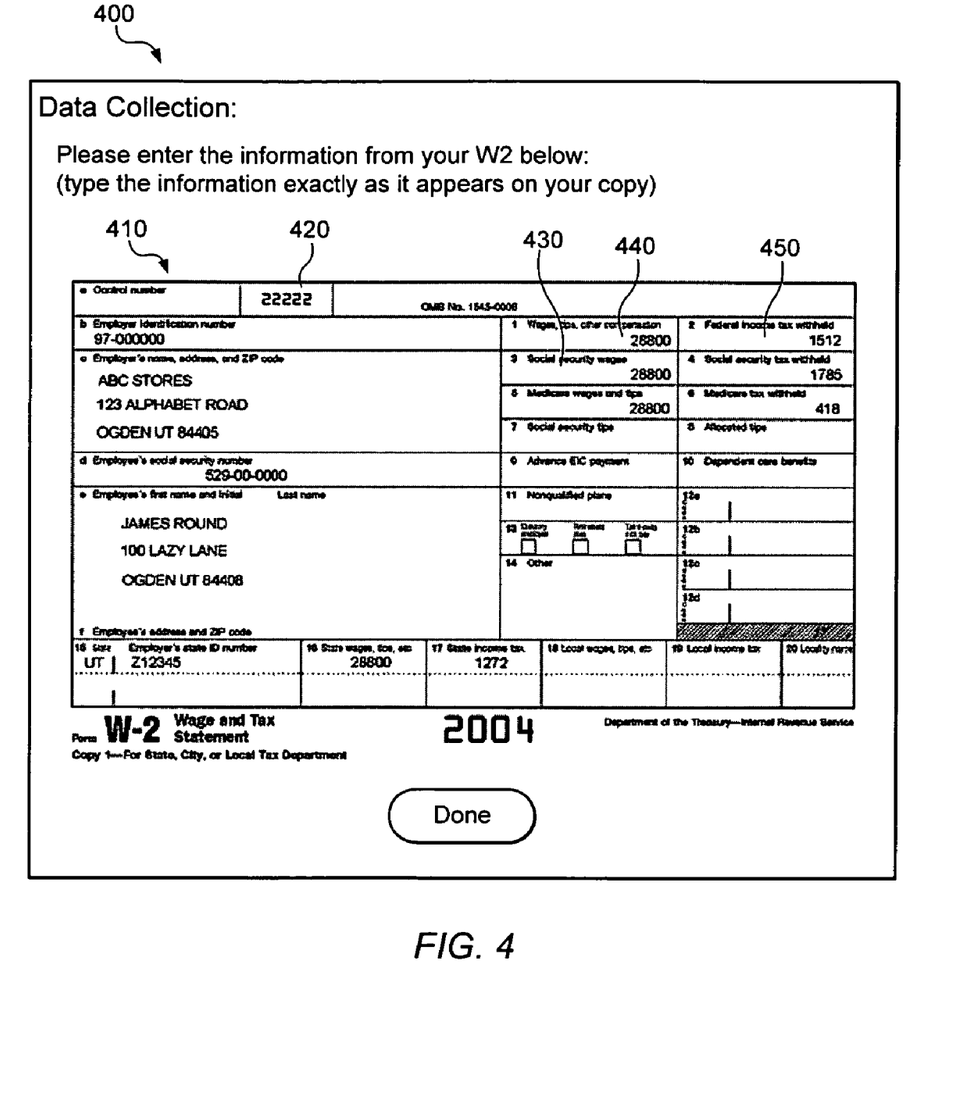
FIG. 4 is a block diagram illustrating one embodiment of a user interface for document data collection, as described herein.

If, however, document data collection system 120 was able to identify the user's document, document data collection system 120 may be configured to allow the user to enter data from the document into document data collection system 120. FIG. 4 illustrates one embodiment of a user interface for entering the data from a document. Document data collection system 120 may be configured to display user interface 400 that includes an image 410 of the user's document without any data filled in. In some embodiments various portions of the displayed image may also be active user interface elements allowing the user to enter data from the physical document into document data collection system 120. For example, as illustrated in FIG. 4, various fields of document image 410, such as text entry boxes 420, 430, 440 and 450 may be active user interface fields allowing the user to type in values from the physical document. While FIG. 3 illustrates textual entry fields, in other embodiments, document data collection system 120 may also include menu selection fields, such as combo-boxes, pop-up or pull-down menus, check boxes and/or radio buttons, allowing the user to select from various options rather than having to type all data completely.

Document data collection system 120 may be configured to collect only some of the items of data from a document and may be configured to not require, or suggest, that the user enter certain types of information from a document, if document data collection system 120 determines that certain types of information from a document are not required or relevant. In other embodiments, however, document data collection system 120 may be configured to accept whatever data the user enters and may determine the relevance of the data after the user has entered data for all the documents the user enters.

Additionally, document data collection system 120 may be configured to utilize information collected previously to fill in either default data or data options for the user, such as from data already entered by the current user, from information entered by another user (e.g. a system administrator, company manger, or professional tax preparer), or from information gathered from a previous data collection process (e.g. from a previous year's tax return preparation).

In some embodiments, rather that requiring the user to type in the data from the document, document data collection information may be configured to analyze a scanned image of the user's document, such as by performing optical character recognition (OCR), and determine some or all of the data from the document. Thus, in one embodiment, document image 410 may include data determined by document data collection system 120 from a scanned image of the user's document. For example, edit fields 420, 430 440 and 450 may include values determined by document data collection system 120 via analysis of a scanned image of the user's document. The user may then verify that the values displayed are correct by comparison to the values on physical document. As described above, in some embodiments document data collection system 120 may be configured to receive or import a scanned image of a document as, or as part of, a user's description of the document. In some embodiments, even if the user did not use a scanned image of a document as a description for document identification purposes, document data collection system 120 may be configured to use a scanned image of the document for data entry/collection purposes. Thus, document data collection system 120 may be configured to analyze a scanned image of a document to identify the document and/or to determine various items of data from the document, according to various embodiments.

As noted above, document data collection system 120 may be configured to receive or import a scanned image of a document in various ways, whether as part of a user's description of a document or for data collection via image analysis, such as OCR. For instance, document data collection system 120 may be configured to directly interface with a image capture device 160, such as a digital camera, webcam, flatbed scanner, or other image capture means, to directly receive a scanned image of the document. In other embodiments however, document data collection system 120 may also be configured to import a previously scanned, or digitally generated, image of a document. For example, a user may have previously scanned a document using a separate image scanning application or may have received or generated a digital version of a document, such as using third party image creation software. For instance, the user may have used software that creates .PDF versions of an electronic document (such as via Adobe Systems™ PDF Print Engine™ software). In yet other embodiments, document data collection system 120 may be configured to automatically capture data from an electronic document or display in another application. For example, document data collection system 120 may be configured to capture data from another application, such as a word processing or web browser application, in which an electronic version of a document is current displayed. For instance, a user may be able to connect via a web browser and the Internet to an employer's web site and display an electronic version of a W2 statement. Document data collection system 120 may then be configured to automatically capture data from the electronic W2 statement displayed in the web browser, according to one embodiment. Document data collection system 120 may be configured to capture such data using any of various techniques, including importing the HTML data directly, using image capture technology to capture a screen image and using OCR techniques to determine the actual data, and screen scraping, among other data capture techniques.

Additionally, as noted above document data collection system may also be configured, in some embodiments, to import data from an electronic version of a document or to communicate with a remote system, such as over a network or the Internet, and directly download a document's content. For example, document data collection system 120 may be configured to download data for a user's document, such as W2 information or bank account interest information, directly from the information provider, such as a W2 provider or a financial institution. Thus, document data collection system 120 may be configured to allow a user to type in a document's data, import the documents' data from an image of the document (such as by using OCR functionality), capture the data from an another application that has the document displayed, or import the data directly in an electronic format, according to various embodiments.

After the user has entered the data from a document or has verified the data supplied by document data collection system 120, document data collection system 120 may store the data for the document in any suitable manner and allow the user identify and enter data for additional documents.

Figure 5:
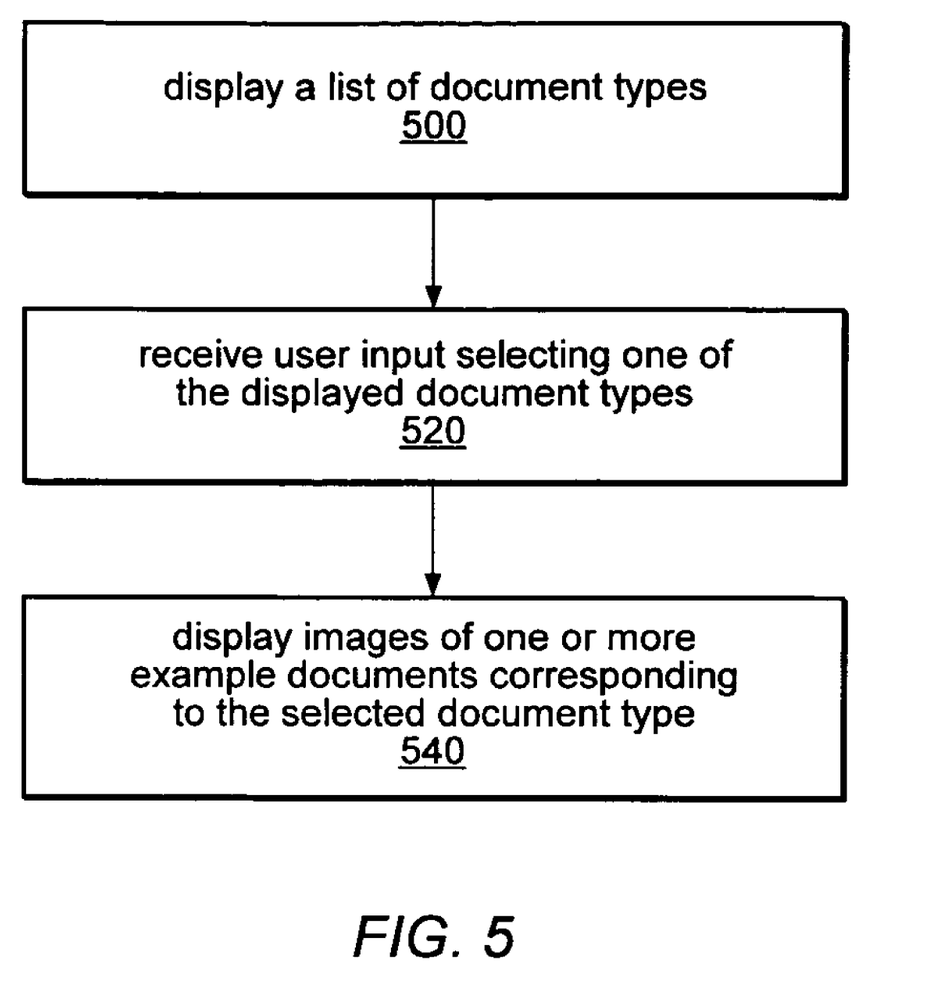
FIG. 5 is a flowchart illustrating one embodiment of a method for document identification, as described herein.

As described above, document data collection system 120 may utilize various techniques to identify a document. As noted above, document data collection system 120 may use a user-supplied description, possibly including a scanned image of the document, to identify a document. Document data collection system 120 may also display images of example documents and ask the user to select an image that resembles the document. Additionally, in some embodiments, document data collection system 120 may display a list of document types allowing the user to select the document type for which to enter data. For example, a user may already know the type of document and thus may not need document data collection system 120 to identify the document. Thus, document data collection system 120 may be configured to allow the user to select a document type for which to enter data and allow the user to select the order in which to enter documents. FIG. 5 is a flowchart illustrating one embodiment of a method for document data entry. As illustrated by block 500, document data collection system 120 may display a list of document types, such as in a listbox, popup menu or pulldown menu user interface element. The user may then select the type of document. Thus, document data collection system 120 may receive user input selecting one of the displayed document types, as illustrated by block 520.

Figure 6:
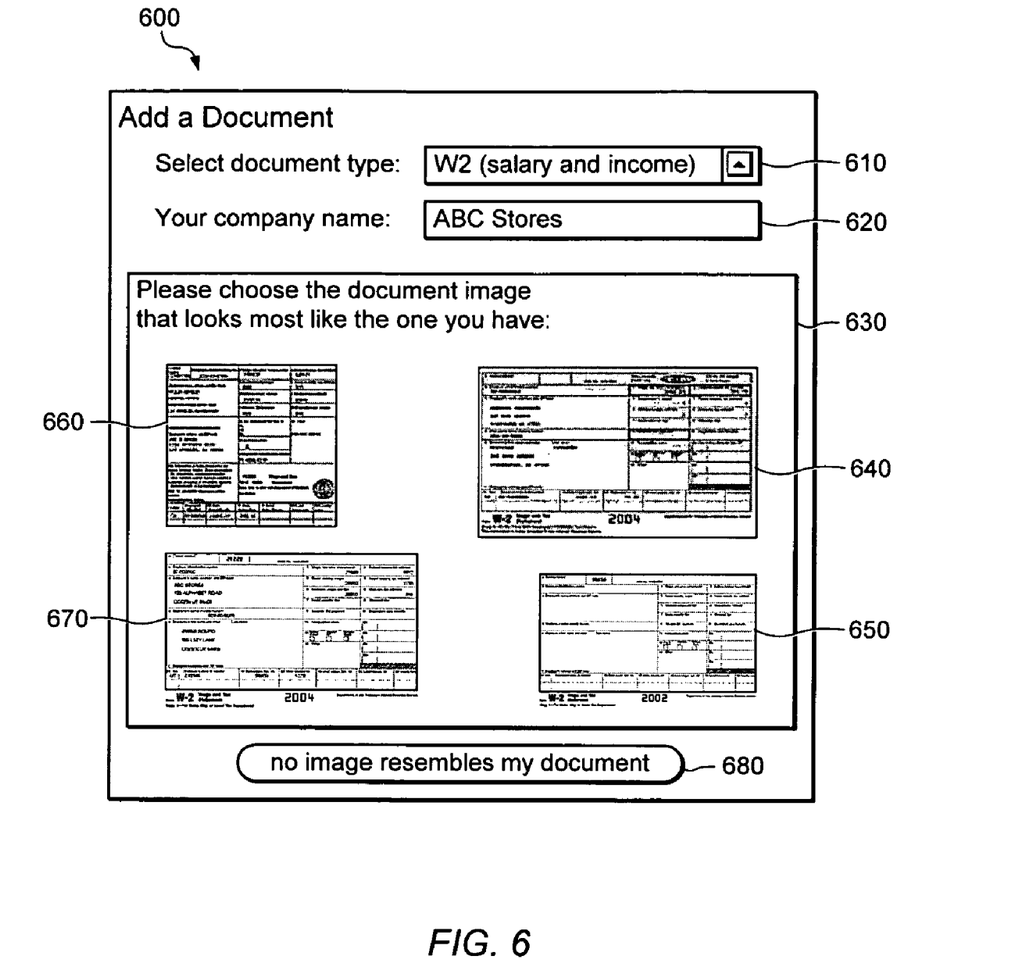
FIG. 6 is a block diagram illustrating one embodiment of a user interface for identifying a document, as described herein.

Even through the user may have manually selected a document type, as described above, document data collection system 120 may be configured to display images of example documents corresponding to the selected document type, as illustrated by block 540. For instance, the user may have selected "W2" as a document type and document data collection system 120 may display images of various types of W2 documents, perhaps each with a different document format. As described above, each displayed image may also be an active user interface element allowing the user to select an image that resembles the actual document. FIG. 6 illustrates one embodiment of a user interface for implementing the method described above regarding FIG. 5. Document data collection system 120 may display user interface 600 including document type selection control 610, according to some embodiments. Additionally, document data collection system 120 may also display additional user interface controls allowing the user to enter additional information regarding the document. For example, as illustrated in FIG. 6, after the user selects a "W2" document type from control 610, document data collection system 120 may then display or activate control 620, requesting the name of the business that provided the W2 statement. Thus, in some embodiments, document data collection system 120 may be configured to ask for additional information, displaying or activating additional user interface controls as appropriate. Document data collection system 120 may use the extra information supplied by the user, such as the name of the company providing a W2 statement, to select which example images to display. For example, as noted above, document data collection system 120 may be configured to associate various document types or example images with particular companies.

In response to the user selecting a document type and possibly supplying additional information, document data collection system 120 may be configured to display the example images, such as images 640, 650, 660, and 670, allowing the user to select an image that resembles the actual document. In some embodiments, document data collection system 120 may be configured to allow the user to specify that none of the images resemble the actual document, such as by selected pushbutton 680. In response to the user input specifying that none of the example images resemble the actual document, document data collection system 120 may be configured to display additional example images, request that the user import a scanned image of the actual document, or may also be configured to proceed with data collection without the aid of an document image.

When document data collection system 120 does not have an example image that resembles the user's document, as noted above, the user may be asked to import a scanned image of the document, in some embodiments. As with the other uses of scanned images described above, document data collection system 120 may be configured to directly interface with an image scanning device or may be configured to import an image scanned using other, third-party image scanning systems. In some embodiments, document data collection system 120 may be configured to add the newly scanned image, perhaps after removal of the user's data, to a collection of example images for later use, such as for document identification and/or data entry. Additionally, in some embodiments, document data collection system 120 may be configured to communicate the newly scanned image to a remote computer, such as customer service server 150. For example, the new scanned image may then be incorporated into future versions or releases of document data collection system 120. Additionally, the newly scanned image may be made available for other instances of document data collection system 120 to download for use when selecting example images to display, such as for document identification and/or data entry/collection, as described above. Thus, as document data collection system 120 imports new example images and communicates them to customer service server 150, for example, an increasingly large and robust repository of images may be collected and used by other users and future versions of the data collection system, according to some embodiments.

Figure 7:
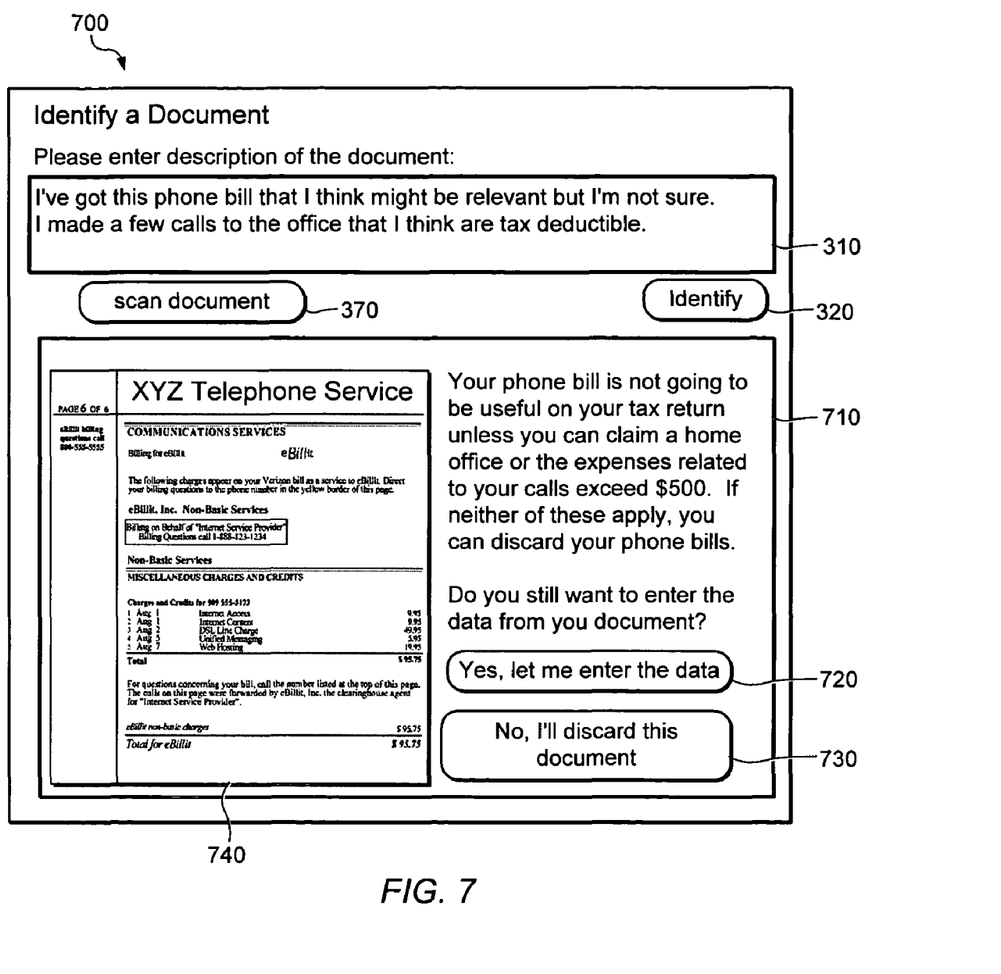
FIG. 7 is a block diagram illustrating one embodiment of a user interface for identifying a document, as described herein.

As described above, after identifying a user's document, either via user selection of a document type or via automatic document identification by document data collection system 120, document data collection system 120 may be configured to determine whether the document is appropriate for data collection in the current application and for data to be used to perform the particular task at hand. For example, when using tax return preparation software, a user may have documents that appear to be tax return related but which may not be relevant to the current tax return being prepared due to the user's individual situation. For instance, a user's phone bill may or may not be appropriate for data collection depending upon the nature of the current tax return, such as whether or not the user can claim a home office or based on the amount of expenses related to the phone calls. FIG. 7 illustrates one embodiment of a user interface 700 for informing the user that a document may not be appropriate for data collection.

In response to a user supplying a description of a document, such as via text entry field 310, and requesting the document data collection system 120 to identify the document, such as via button 320, document data collection system 120 may determine that the document is not appropriate for data collection, as described above. In some embodiments, document data collection system 120 may be configured to display an explanation 710 of why the document was determined not to be appropriate for data collection and may also be configured to display either the actual scanned image of the document, if a scanned image of the document was received, or an example image of the type of document identified, such as in image control 740. Additionally, document data collection system 120 may be configured to display controls, such as buttons 720 and 730, allowing the user to choose to enter data from the document anyway or to discard the document and not enter any data from the document. Document data collection system 120 may be configured to collect data for a document determined not to be appropriate for data collection if the user desires, such as in case the user thinks that the document will later be determined to be appropriate. For instance, since, in some embodiments, document data collection system 120 may allow the user to enter data for documents in any order, data or information collected later may change the determination as to whether a particular document is appropriate or relevant to a particular task, such as preparing a tax return. Thus, document data collection system 120 may be configured to collect data for whatever documents the user decides to enter and then, after the user has finished entering data, determine the relevance of each document and/or piece of data.

Figure 8:
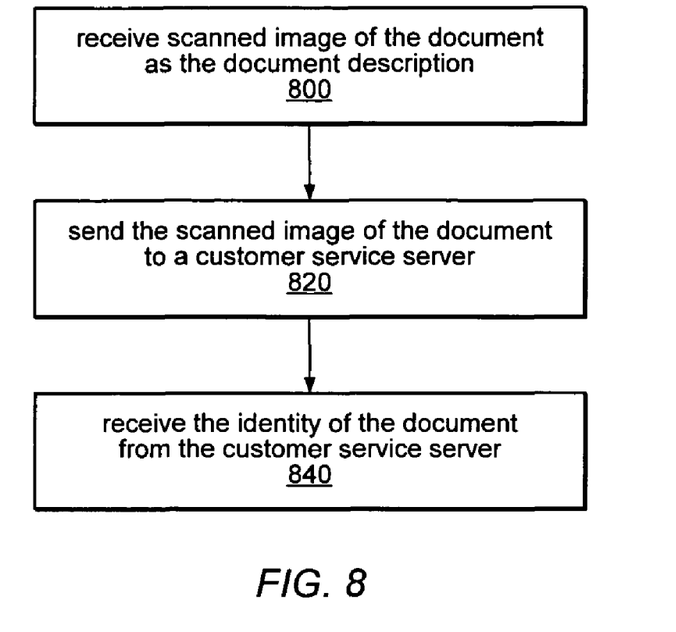
FIG. 8 is a flowchart illustrating one embodiment of a method for identifying a document, as described herein.

Document data collection system 120 may also communicate with a remote computer when identifying a user's document. FIG. 8 is a flowchart illustrating one embodiment of a method for identifying a document utilizing a remote computer. For example, as illustrated by block 800, document data collection system 800 may be configured to receive a scanned image of a document as, or as part of, the user-supplied document description, as described above. As part of identifying the document, document data collection system 120 may, in some embodiments, be configured to send the scanned image of the document to a remote computer, such as to customer service server 160, as illustrated by block 820. In one embodiment, document data collection system 120 may be configured to send a scanned image of a document to a remote computer only if document data collection system 120 cannot identify the document itself. In other embodiments, however, document data collection system 120 may be configured to routinely send scanned images of documents to the remote computer for identification or for use in supplying additional example images of document types.

The remote computer, such as customer service server 160, may be configured to perform various automatic document identification processes to identify the document, such as those described above regarding document data collection system 120. Additionally, human analysts may also analyze the scanned image via the remote computer, or via other equipment connected to the remote computer, to determine the identity of the document. For example, a particular scanned image may not be of the best quality and it may therefore be difficult for either document data collection system 120 or customer service server 160 to determine the type of document automatically. However, a human, especially a properly trained human, may be able to determine the type of document from even a poorly scanned document image. Additionally, the user may have a new version of a document type with which document data collection system 120 and customer service server 160 are not familiar. Document data collection system 120 may then receive the identity of the document from the remote computer, as illustrated by block 840.

Figure 9:
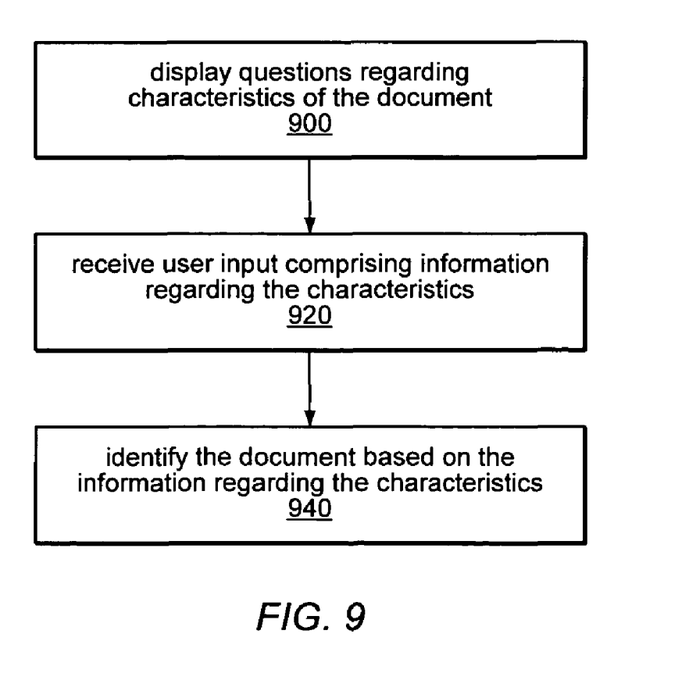
FIG. 9 is a flowchart illustrating one embodiment of a method for identifying a document, as described herein.

As described above, in response to the user opting to use a different document identification process, document data collection system 120 may be configured to ask various questions regarding the document, such as requesting various characteristics of the document, to identify the type of document, as illustrated in FIG. 9. FIG. 9 is a flowchart illustrating one embodiment of a method for identifying a document. In one embodiment document data collection system 120 may be configured to display questions regarding various characteristics of the document, as illustrated by block 900.

For example, document data collection system 120 may be configured to ask that the user specify the number and/or type of data items on the document. In another embodiment, document data collection system 120 may be configured to ask the user to specify one or more of the data labels from the document or to supply the type and/or name of the company or institution that supplied the document. Document data collection system 120 may then receive user input comprising information regarding characteristics of the document, as illustrated by block 920. Thus, by displaying one or more questions, and receiving user input including information, regarding various characteristics of the document, document data collection system 120 may identify the document based on the user-supplied information regarding the document's characteristics, as illustrated by block 940.

After document data collection system 120 has received data for all the documents the user desires to enter, as described above. Document data collection system 120 may be configured to analyze all the collected data and documents to perform a task for which the data was collected. For example, document data collection system 120 may be part of a tax return preparation application and therefore document data collection system 120 may be configured to prepare a tax return based on the data collected from the documents entered by the user. Additionally, in some embodiments, document data collection system 120 may be configured to request additional information from the user. For example, the user may have forgotten to enter a particular document and document data collection system 120 may request that the user enter data for that document.

In some embodiments, document data collection system 120 may be configured to provide the user the option of either entering data from documents in a user-specified order (i.e. in whatever order the user chooses, including no particular order at all), or of having document data collection system 120 direct the collection of document data. In one embodiment, after the user has finished entering data for the documents the user wants to enter, document data collection system 120 may then ask the user questions in a more traditional manner to obtain additional information from the user. In some embodiments, document data collection system 120 may be configured to allow the user to shift from user-driven and software driven document data collection and back again whenever the user desires.

While the description of document data collection system 120 above is described mainly in reference to a user entering data for various documents all in one session, in some embodiments, document data collection system 120 may be configured to allow the user to enter document data piecemeal, such as over several months, as documents are available or the when user has time. Thus, document data collection system 120 may be configured to store entered document data and wait until the user specifically requests that the data be analyzed. For instance, document data collection system 120 that is part of a tax return preparation application may be configured to collect document data whenever the user enters it, but not analyze the data to prepare an actual tax return until the user specifically requests document data collection system 120 to do so. Alternatively, in some embodiments, document data collection system 120 may be configured to analyze whatever data has been entered after each document's data is entered. Thus, document data collection system 120 may be configured to maintain a current analysis of the user's data as documents are entered.

Figure 10:
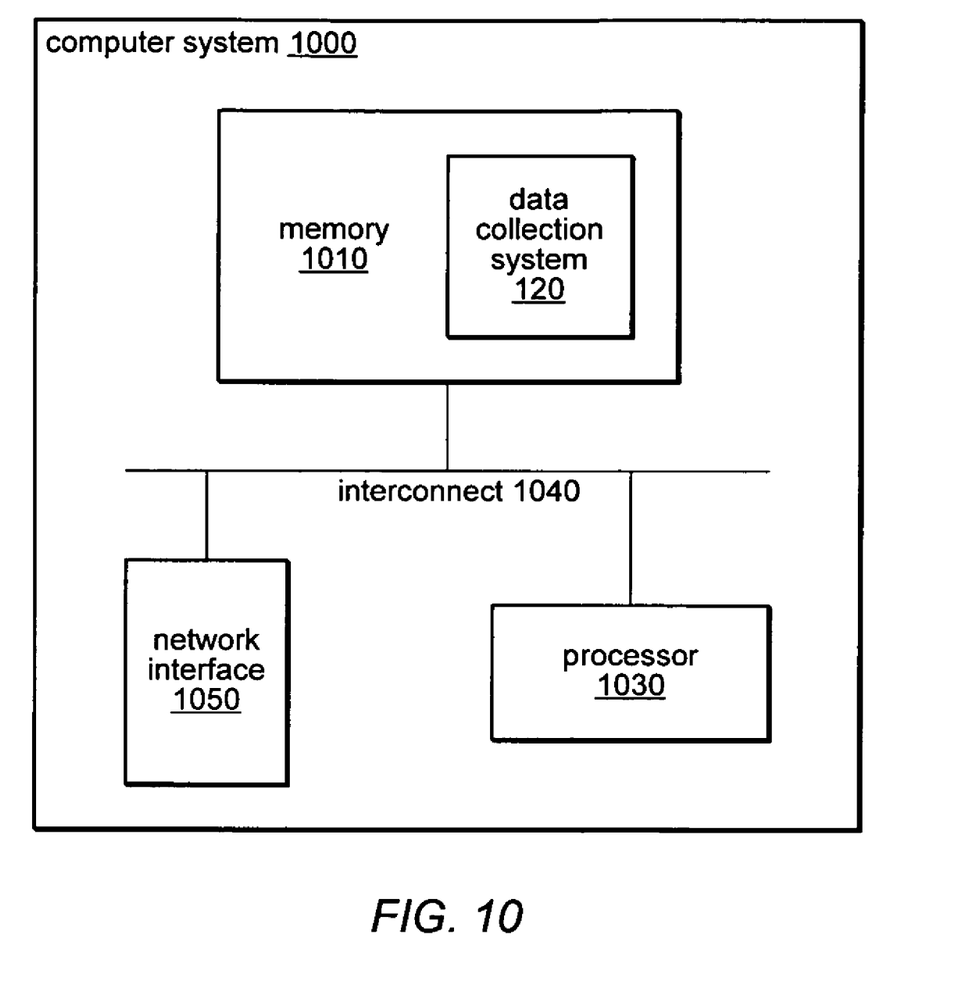
FIG. 10 illustrates a computing system capable of implementing user-driven document data collection, according to one embodiment.

As described above, document data collection system 120 may execute on various types of computer systems. FIG. 10 illustrates a computing system capable of implementing a document data collection system, such as document data collection system 120, as described herein and according to various embodiments. Computer system 1000 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, or in general any type of computing device. In various embodiments, computer system 1000 may represent web server 110 or user computer 140, described above.

The document-based data collection system described herein may be provided as a computer program product, or software, that may include a computer-readable storage medium having stored thereon instructions, which may be used to program a computer system (or other electronic devices) to implement a document data collection system as described herein. A computer-readable storage medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magnetooptical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, or other types of signals or mediums.).

A computer system 1000 may includes a processor unit 1030 (possibly including multiple processors, a single threaded processor, a multi-threaded processor, a multi-core processor, or other type of processor). The computer system 1000 may also include one or more system memories 1010 (e.g., one or more of cache, SRAM DRAM, RDRAM, EDO RAM, DDR RAM, SDRAM, Rambus RAM, EEPROM, or other memory type), an interconnect 1040 (e.g., a system bus, LDT, PCI, ISA, or other bus type), and a network interface 1050 (e.g., an ATM interface, an Ethernet interface, a Frame Relay interface, or other interface). The memory medium 1010 may include other types of memory as well, or combinations thereof. Embodiments of the document-based data collection system described herein may include fewer or additional components not illustrated in FIG. 10 (e.g., video cards, audio cards, storage devices, additional network interfaces, peripheral devices, or other components). The processor unit 1030, the network interface 1050, and the system memory 1010 may be coupled to the interconnect 1040. It should also be noted that one or more components of system 1000 might be located remotely and accessed via a network. One or more of the system memories 1010 may embody a document data collection system 120.

Network interface 1040 may be configured to enable computer system 1000 to communicate with other computers, systems or machines, such as across network 100, described above. Network 100 may enable data communication between computer system 1000 and among other entities illustrates in FIGS. 1A and 1B, described above. Network interface 1040 may use standard communications technologies and/or protocols. Network 100 may include, and network interface 1040 may utilize, links using technologies such as Ethernet, 802.11, integrated services digital network (ISDN), digital subscriber line (DSL), and asynchronous transfer mode (ATM) as well as other communications technologies. Similarly, the networking protocols used on network 100 may include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP), among other network protocols. The data exchanged over network 100 by network interface 1040 may be represented using technologies, languages, and/or formats, such as the hypertext markup language (HTML), the extensible markup language (XML), and the simple object access protocol (SOAP) among other data representation technologies. Additionally, all or some of the links or data may be encrypted using any suitable encryption technologies, such as the secure sockets layer (SSL), Secure HTTP and/or virtual private networks (VPNs), the international data encryption standard (DES or IDEA), triple DES, Blowfish, RC2, RC4, RC5, RC6, as well as other data encryption standards and protocols. In other embodiments, custom and/or dedicated data communications, representation, and encryption technologies and/or protocols may be used instead of, or in addition to, the particular ones described above.

In some embodiments, memory 1010 may include program instructions configured to implement a document data collection system 120, as described herein. Document data collection system 120 may be implemented in any of various programming languages or methods. For example, in one embodiment, document data collection system 120 may be JAVA based, while in another embodiments, it may be implemented using the C or C++ programming languages.

While the document-based data collection system has been described with reference to various embodiments, it will be understood that these embodiments are illustrative and that the scope of the document-based data collection system is not limited to them. Many variations, modifications, additions, and improvements are possible. More generally, the present document-based data collection system is described in the context of particular embodiments. For example, the blocks and logic units identified in the description are for ease of understanding and not meant to limit the document-based data collection system to any particular embodiment. Functionality may be separated or combined in blocks differently in various realizations or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the document-based data collection system as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A system for preparing a tax return, comprising:
a processor;
a memory operatively coupled to the processor; and
a document data collection system (DDCS) executing on the processor and configured to:
  receive user input, from a user of the DDCS, comprising a document and a document description of the document;
  display a list of document types;
  receive a user selection, from the user of the DDCS, of a document type from the list of document types;
  display a plurality of images of example documents corresponding to the document type;
  receive an image selection, from the user of the DDCS, from the plurality of images;
 determine an identity of the document based on the image selection;
  determine that the document contains tax data usable for the tax return based on the identity of the document;
  extract the tax data contained in the document; and
  populate the tax return with the tax data.

2. The system of claim 1, wherein the description of the document comprises a scanned image of the document.

3. The system of claim 1, wherein the DDCS is further configured to:
send a scanned image of the document to a customer service server; and
receive the identity of the document from the customer service server.

4. The system of claim 1, wherein the DDCS is further configured to:
display a plurality of questions regarding characteristics of the document;
receive user input comprising information regarding the characteristics; and
identify the document based on the user input.

5. The system of claim 1, wherein the description comprises a human language description of a characteristic of the document.

6. The system of claim 1, wherein the DDCS is further configured to:
display a user interface comprising a layout corresponding to a layout of the document and a user interface control corresponding to a data field of the document; and
receive user input, via the user interface, comprising data from the document.

7. The system of claim 1, wherein the DDCS is further configured to:
receive a scanned image of the document; and
extract data from the scanned image.

8. The system of claim 1, wherein the DDCS is further configured to:
identify the document as inappropriate for data collection; and
inform the user that the document is inappropriate for data collection.

9. The system of claim 1, wherein the DDCS is further configured to:
receive new user input, from the user of the DDCS, comprising a new document and a new document description of the new document;
display the list of document types;
receive a new user selection, from the user of the DDCS, of a new document type from the list of document types;
determine a new identity of the new document based on the new user selection and the new document description;
determine that the new document contains new tax data usable for the tax return based on the new identity;
extract the new tax data contained in the new document; and
populate the tax return with the new tax data.

10. A method for preparing a tax return, comprising:
receiving user input, from a user, comprising a document and a document description of the document;
displaying a list of document types;
receiving a user selection of a document type from the list of document types;
displaying a plurality of images of example documents corresponding to the document type;
receiving an image selection, from the user, from the plurality of images;
determining, using a processor, an identity of the document based on the image selection;
determining, using the processor, that the document contains tax data usable for the tax return based on the identity of the document;
extracting, using the processor, the tax data contained in the document; and
populating the tax return with the tax data.

11. The method of claim 10, wherein the description comprises a scanned image of the document.

12. The method of claim 10, further comprising:
sending a scanned image of the document to a customer service server; and
receiving the identity of the document from the customer service server.

13. The method of claim 10, further comprising:
displaying a plurality of questions regarding characteristics of the document;
receiving user input, from the user, comprising information regarding the characteristics; and
identifying the document based on the user input.

14. The method of claim 10, wherein the description comprises a human language description of a characteristic of the document.

15. The method of claim 10, further comprising:
displaying a user interface comprising a layout corresponding to a layout of the document and a user interface control corresponding to a data field of the document; and
receiving user input, via the user interface, comprising data from the document.

16. The method of claim 10, further comprising:
receiving a scanned image of the document; and
extracting data from the scanned image.

17. The method of claim 10, further comprising:
identifying the document as inappropriate for data collection; and informing the user that the document is inappropriate for data collection.

18. The method of claim 10, further comprising:
receiving new user input, from the user, comprising a new document and a new document description of the new document;
displaying the list of document types;
receiving a new user selection, from the user, of a new document type from the list of document types;
determining a new identity of the new document based on the new user selection and the new document description;
determining that the new document contains new tax data usable for the tax return based on the new identity;
extracting the new tax data contained in the new document; and
populating the tax return with the new tax data.

19. A computer readable medium storing instruction for preparing a tax return, the instructions executable on a processor and comprising functionality for:
receiving user input, from a user, comprising a document and a document description of the document;
displaying a list of document types;
receiving a user selection of a document type from the list of document types;
displaying a plurality of images of example documents corresponding to the document type;
receiving an image selection, from the user, from the plurality of images;
determining an identity of the document based on the image selection;
determining that the document contains tax data usable for the tax return based on the identity of the document;
extracting the tax data contained in the document; and
populating the tax return with the tax data.

20. The computer readable medium of claim 19, wherein the description comprises a scanned image of the document.

21. The computer readable medium of claim 19, the instructions further comprising functionality for:
sending a scanned image of the document to a customer service server; and
receiving the identity of the document from the customer service server.

22. The computer readable medium of claim 19, the instructions further comprising functionality for:
displaying a plurality of questions regarding characteristics of the document;
receiving user input, from the user, comprising information regarding the characteristics; and
identifying the document based on the user input.

23. The computer readable medium of claim 19, wherein the description comprises a human language description of a characteristic of the document.

24. The computer readable medium of claim 19, the instructions further comprising functionality for:
displaying a user interface comprising a layout corresponding to a layout of the document and a user interface control corresponding to a data field of the document; and
receiving user input, via the user interface, comprising data from the document.

25. The computer readable medium of claim 19, the instructions further comprising functionality for:
receiving a scanned image of the document; and
extracting data from the scanned image.

26. The computer readable medium of claim 19, the instructions further comprising functionality for:
identifying the document as inappropriate for data collection; and
informing the user that the document is inappropriate for data collection.

27. The computer readable medium of claim 19, the instructions further comprising functionality for:
receiving new user input, from the user, comprising a new document and a new description of the new document;
displaying the list of document types;
receiving a new selection, from the user, of a new document type from the list of document types;
determining a new identity of the new document based on the new selection and the new description;
determining that the new document contains new tax data usable for the tax return based on the new identity;
extracting the new tax data contained in the new document; and
populating the tax return with the new tax data.

* * * * *